Patented Nov. 21, 1950

2,530,367

UNITED STATES PATENT OFFICE 2,530,367

DISPROPORTIONATION OF ALKOXYSILANES

Charles R. Hance, Durham, N. C., and George H. Wagner, Kenmore, N. Y., assignors to The Linde Air Products Company, a corporation of Ohio No Drawing. Application December 6, 1947, Serial No. 790,230

5 Claims. (Cl. 260—448.8)

The invention is a process for disproportionating alkoxysilanes. It affords a means of effecting, in an assemblage of silicon-containing molecules each comprising at least one hydrogen atom and at least one alkoxy group, a redistribution in such fashion that silicon-containing molecules devoid of alkoxy groups are formed concomitantly with silicon-containing molecules in which no Si—H bond is present. Thus, triethoxysilane $$SiH(OC_2H_5)_3$$

a readily available compound, can be caused to undergo the transformation depicted by the equation $$4SiH(OC_2H_5)_3 \rightarrow SiH_4 + 3Si(OC_2H_5)_4$$

Valuable products are thereby formed—in this example silane and tetraethylorthosilicate.

The disproportionation is carried out by treating the alkoxysilane with a suitable catalyst at an appropriate temperature. For the catalyst we prefer a compound of the type represented by the formula MOR, where M is a metal of group IA of the periodic table, and R is hydrogen or an alkyl group. The hydroxides and ethoxides of sodium and potassium are preferred. The quantity of catalyst used is not critical, and since the preferred catalysts are inexpensive substances, 0.5% or more has been used in most of our tests.

The temperature employed may range from room temperature or below to moderate heating, for example to 60° C. Raising the temperature accelerates the reaction but may reduce the efficiency, as by causing hydrogen to appear in considerable proportions in the gaseous product. Even at room temperatures the velocity of the reaction is such as to be adequate in many cases. Thus, when 0.65% of NaOC$_2$H$_5$ was added to 7.5 g. of SiH(OC$_2$H$_5$)$_3$ at 26° C., silane was evolved at the rate of 3.3 cc. per minute; at 40° C. the rate increased to 4.4 cc./min., and at 60° C. to 8.4 cc./min. Increasing the proportion of ethoxide catalyst to 2.1% gave 20.7 cc./min. of silane at 26° C. The hydroxides show activity of the same order as the ethoxides. If a very rapid evolution of gas is desired, as in some prospective applications of the invention, either the proportion of catalyst or the temperature or both are increased. Thus, with 13% of NaOH at 60° C. silane (containing some 30% of H$_2$) was evolved at the rate of more than 50 cc./min. from a 7.5 g. sample of SiH(OC$_2$H$_5$)$_3$.

What is claimed is:

1. Process of disproportionating an alkoxysilane containing at least one hydrogen atom attached to silicon, which comprises treating said alkoxysilane, at a temperature not substantially above about 60° C., with a compound in solid form having the type formula MOR, where M is a metal of group IA of the periodic table, and R is a member of the group consisting of hydrogen and alkyl radicals, and recovering silane from the reaction product.

2. Process of disproportionating an alkoxysilane containing at least one hydrogen atom attached to silicon, which comprises treating said alkoxysilane, at a temperature not substantially above about 60° C., with a solid alkali metal alkoxide, and recovering silane from the reaction product.

3. Process of disproportionating an alkoxysilane containing at least one hydrogen atom attached to silicon, which comprises treating said alkoxysilane, at a temperature not substantially above about 60° C., with a solid alkali metal hydroxide, and recovering silane from the reaction product.

4. Process of disproportionating a trialkoxysilane which comprises treating it, at a temperature not substantially above about 60° C., with a solid alkali metal alkoxide, and recovering silane from the reaction product.

5. Process of disproportionating triethoxysilane which comprises treating it, at a temperature not substantially above about 60° C., with a compound in solid form having the type formula MOR, where M is a metal of group IA of the periodic table, and R is a member of the group consisting of hydrogen and alkyl radicals, and recovering silane from the reaction product.

CHARLES R. HANCE.
GEORGE H. WAGNER.

REFERENCES CITED

The following references are of record in the file of this patent:

Friedel: "Annalen der Chemie," vol. 143 (1867) pages 124–127.

Taurke: "Berichte," vol. 38 (1905) pages 1661, 1662.

Post: "The Chemistry of Aliphatic Ortho Esters," pages 146, 147. Published by Reinhold, N. Y., 1943.